United States Patent [19]

Ehn

[11] Patent Number: 4,531,160

[45] Date of Patent: Jul. 23, 1985

[54] DISPLAY PROCESSOR SYSTEM AND METHOD

[75] Inventor: Dennis C. Ehn, Newton, Mass.

[73] Assignee: Itek Corporation, Lexington, Mass.

[21] Appl. No.: 491,129

[22] Filed: May 3, 1983

[51] Int. Cl.[3] ........................ H04N 3/12; H04N 5/66; H04N 1/22

[52] U.S. Cl. .................................... 358/240; 358/230; 358/298; 340/793

[58] Field of Search ............... 358/230, 240, 283, 298; 340/728, 793; 315/169.1, 169.3, 169.4

[56] References Cited

U.S. PATENT DOCUMENTS

| | | | |
|---|---|---|---|
| 3,937,878 | 2/1976 | Judice | 358/240 |
| 3,959,583 | 5/1976 | Judice et al. | 358/240 |
| 3,997,719 | 12/1976 | Judice | 358/240 |
| 4,258,393 | 3/1981 | Ejiri et al. | 358/283 |

OTHER PUBLICATIONS

D. R. Thompson, Digital Halftone Method for Matrix Displays, IBM Technical Disclosure Bulletin, vol. 20, No. 1 (Jun. 1977).

*Primary Examiner*—John C. Martin
*Assistant Examiner*—E. Anne Toth
*Attorney, Agent, or Firm*—Michael H. Wallach; Robert F. Rotella

[57] ABSTRACT

A technique for reproducing an image in a set of grey scale steps is disclosed including: providing a plurality of superpixels for providing an output representative of an image; providing a set of threshold levels for each pixel in a superpixel, which set is different from each of the sets of threshold levels of the other pixels in that superpixel and different from the set of greyscale steps; identifying the position of a given pixel in a superpixel and designating a particular set of threshold levels corresponding to the position of that given pixel; comparing the output of the given pixel with its particular set of threshold levels; and indicating the greyscale step in the set of greyscale steps in response to the output of the given pixel equal to or in excess of at least one of the threshold levels in the set of threshold levels corresponding to that pixel position.

5 Claims, 8 Drawing Figures

DISPLAY PROCESSOR SYSTEM AND METHOD

FIELD OF INVENTION

This invention relates to a display processor with improved grey level threshold coding to increase greyscale resolution, and more particularly, to a system and method for assigning various threshold levels to the individual pixel elements of a display processor in order to provide increased greyscale resolution.

BACKGROUND OF INVENTION

The traditional use of digital display devices for reproduction or representation of continuous-tone imagery has been hampered somewhat by inefficiencies in spatial resolution and inaccurate reproduction caused by the limited number of available greyscale steps or levels in most display devices. A display device with a limited number of greyscale steps does not accurately represent an image to the observer. Gradual variations in intensity levels may appear to have a banded structure and low modulation features may be lost entirely. The performance of the display may be improved by rescaling the image to use the available levels to the best advantage. This, however, is often not sufficient to solve the problem. Alternative grouping of pixels has been used to enhance the accuracy of reproduction of images; however, a loss of resolution still occurs. It is desirous, therefore, to improve the quality and distinction of grey scale resolution in such devices.

Recent attempts to increase greyscale resolution have included varying the duration of an input signal generator in order to vary the duration of the actual input signal (U.S. Pat. No. 3,526,711, Sept. 1, 1970, T. J. DeBoer, "Device Comprising a Display Panel Having a Plurality of Crossed Conductors Driven by an Amplitude to Pulse Width Converter"), and varying the length of time that a bi-stable element remains activated (U.S. Pat. No. 3,590,156, June 29, 1971, Richard A. Easton, "Flat Panel Display System with Time-Modulated Grey Scale"), thereby increasing the quantity of greyscale levels available for image reproduction. These approaches require extensive peripheral memory capabilities.

Additional improvement techniques have included the use of three source element matrices, each of which may be activated independent of, or simultaneously with, each of the other source matrices. These source matrices are stacked on top of one another and are separated by attenuating layers. The factorial result for three such source matrices, is seven potential greyscale steps ( U.S. Pat. No. 3,626,241, Dec. 7, 1971, Dinh-Tuan Nho, "Grey Scale Gaseous Display"). This approach has proven to be complex and expensive.

The most effective gains in accuracy of reproduction have resulted from the use of a plurality of display cells or source elements to represent each image sample (U.S. Pat. No. 3,845,243, Oct. 29, 1976, Schmersal et al., "System for Producing a Grey Scale With a Gaseous Display and Storage Panel Using Multiple Discharge Elements"), rather than the traditional one to one sampling ratio. This technique is referred to as P.S.A.M. (Pulse Surface Area Modulation). In such applications, a single image sample is represented by an entire superpixel component, composed of several individual pixel elements. While this approach substantially increases the available quantity of non-zero grey levels, such applications suffer inherent drawbacks. For example, a substantial loss of resolution occurs since a larger screen area is necessary to reproduce a single image sample. Consequently, the quantity, complexity and cost of necessary hardware is substantially increased.

Each individual pixel element has an associated set of threshold levels. The actual number of threshold levels for each individual pixel element may vary according to the specific matrix configuration. As the number of threshold levels per pixel element is increased, both the efficiency and cost of the display device increase considerably. While the overall number of threshold levels for each particular element is variable, the quantity and values of each set of threshold levels are identical for all of the pixel elements. In addition, the incremental variance between threshold levels remains uniform throughout the set. Consequently, all of the pixel elements of a superpixel component respond identically to a single image sample. This retention of uniform incremental increases in threshold variances of each individual pixel element and the cost associated with providing additional grey level thresholds substantially limits the number of available grey level steps. This causes a limitation in the accuracy of reproduction of continuous tone imagery. The reproduced image, therefore, while representative of the original image, is not an entirely accurate reproduction.

In addition, the relationship of the uniform threshold coding to the positioning of the pixel elements associated with those threshold codes creates and illuminance pattern that is potentially detrimental to accurate digital reproduction of continuous tone imagery. Another disadvantage of such applications includes the necessity for expensive, complex peripheral memory/storage components.

Increasing the number of available grey level steps in such devices by increasing the number of threshold levels for each individual pixel element would be complex and costly. In addition, certain applications, by their inherent nature, prevent the inclusion of additional threshold levels. Such applications include gas discharge devices, bi-stable elements and drilling of metalized mylar film, in which the quantity of available threshold levels is limited by the physical characteristics of the device.

Increasing the ratio of the pixel elements used to represent each image sample would likewise be complex and costly and would result in a loss of resolution as a result of the larger screen area necessary to reproduce each image sample.

Further attempts to enhance the techniques discussed above have included experimentation with the configuration of the cells or source elements, in order to vary the geometric shape of each image sample representation. Various geometric image configurations have included half-tone dots, half-tone uniform rings, half-tone annular rings, and multiple half-tone concentric rings. Each of these types of geometric configurations possesses certain spatial resolution characteristics and properties. The half-tone ring representation is currently considered the most advantageous for the accurate reproduction of continous tone imagery.

While each of these approaches has improved the digital display process considerably, a still higher level of accuracy in the reproduction of continous-tone imagery by the use of a practical cost-efficient device is still needed.

SUMMARY OF INVENTION

It is therefore an object of this invention to improve grey level resolution in display devices by increasing the number of available grey level thresholds, in order to achieve optimum accuracy in the extraction of information from image data.

It is a further object of this invention to improve the grey level resolution in such devices using increased threshold coding, while maintaining accurate spatial resolution.

It is a further object of this invention to achieve such improved grey level resolution in digital display devices.

It is a further object of this invention to achieve these results with the use of a lesser quantity of individual pixel elements which require fewer extensions of output levels, thereby reducing the cost and complexity of such devices.

It is a further object of this invention to provide such a display processor system in which the threshold levels associated with the individual pixel elements of a superpixel component, while positionally dependent, may be randomly arranged.

It is a further object of this invention to provide such a display processor system in which the threshold variation increment of each individual pixel element of a superpixel component, is non-uniform thereby providing increased grey level resolution capabilities.

It is a further object of this invention to provide such a display processor system in which the threshold levels associated with each individual pixel element of a superpixel component are non-uniform and may vary from the grey scale steps.

It is a further object of this invention to provide such a technique which may be implemented by the use of hardware or software.

The invention results from the realization that improved greyscale resolution can be achieved by applying to each individual pixel element in a group of pixel elements a set of threshold levels which differ from the threshold levels applied to the other pixels in the set and from the set of greyscale steps.

This invention features a display processor system for reproducing an image in a set of greyscale steps. There are a plurality of superpixel components, each including a plurality of pixel elements for providing an output representative of an incident image portion. There are means for providing a set of threshold levels for each pixel element in a superpixel component, which set is different from the sets of threshold levels associated with each of the other pixel elements in that superpixel component and different from the set of greyscale steps. Further, there are means for identifying the position of a given pixel element in the superpixel component and designating the particular set of threshold levels corresponding to the position of that given pixel element. There are means for comparing the output of the given pixel element with its corresponding particular set of threshold levels. Means responsive to the means for comparing indicate a greyscale step in the set of greyscale steps in response to the output of the given pixel equal to or in excess of one or more threshold levels in the set of threshold levels corresponding to that pixel position.

The invention also features a method of reproducing an image in a set of greyscale steps. A set of threshold levels is provided for each pixel element in a superpixel component, which set is different from each of the sets of threshold levels of the other pixel elements in that superpixel component and is different from the set of greyscale steps. The position of a given pixel element in a superpixel component is identified, and the particular set of threshold levels corresponding to the position of that given pixel element is designated. The output from the given pixel element is compared with its corresponding particular set of threshold levels. A greyscale in the set of output greyscale steps is then indicated in response to the output of the given pixel equal to or in excess of one or more threshold levels in the set of threshold levels corresponding to that pixel position.

In a preferred embodiment, the sets of threshold levels are the same for each pixel in a corresponding position of every superpixel. The threshold levels associated with all the sets in a superpixel may constitute a field of uniform increments and the field of uniform increments may be non-uniformly distributed among the pixels of a superpixel.

DISCLOSURE OF PREFERRED EMBODIMENT

Other objects, features and advantages will occur from the following description of a preferred embodiment and the accompanying drawings, in which.

The invention may be accomplished with a display processor system for reproducing an image in a set of greyscale steps. There is an imaging device such as a video tube, or CCD, having a plurality of superpixel components each including a number of pixel elements to provide an output representative of portions of an image which are incident on the imaging device. There is means for providing a set of threshold levels for each pixel element in a superpixel component. These threshold levels may be calculated, or more typically may be stored. Each set of threshold levels for each pixel element of a superpixel component is different than the set of threshold levels for each of the other pixel elements of that superpixel component, and is also different than the levels of the set of greyscale steps. The threshold levels are typically identical for each pixel element in a corresponding position of every superpixel component. All of the threshold levels of all the sets constitute a field of uniform increments. For example, in a 2×2 superpixel containing four pixels with four input threshold levels each, the threshold value increments may be stated in terms of 1/16. In a 3×3 superpixel containing nine pixels with four threshold levels each, the increments may be stated in terms of 1/36. The threshold levels constituting the field of uniform increments may be non-uniformly distributed among the pixels of a superpixel such that the incremental variances between the levels of threshold values in each particular pixel element are not equal. There is some means for identifying the position of a given pixel element in a superpixel component and designating the set of threshold levels corresponding to the position of that given pixel element. For example, control circuits associated with a charge-coupled device (CCD) would indicate the line and column position of each pixel element in the display as it is being read out. That line and column designation is then applied to read from memory the set of threshold values associated with that particular pixel position in the superpixel component. The comparator circuit is used to compare the output from the given pixel element with its associated set of threshold values which has been read from memory. Typically this is done one at a time, beginning with the lowest threshold and moving toward the highest, in order to provide an efficient comparison process whereby once a particular threshold level has been met, the remaining higher thresholds need not actually be tested.

Figure 1:
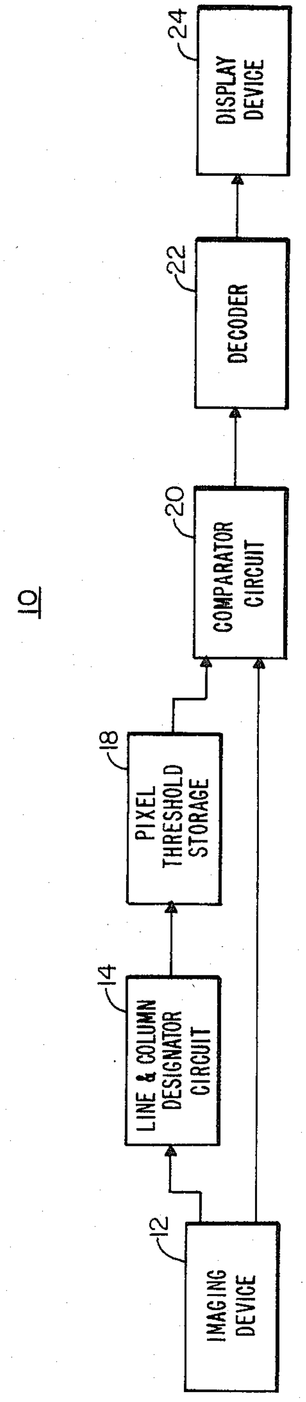
FIG. 1 is a block diagram of a display processor system according to this invention.

There is shown in FIG. 1 a display processor system 10 according to this invention in which imaging device 12 is monitored by line and column designator circuit 14, which identifies the location of each pixel element in order to assign the appropriate set of threshold levels obtained from pixel threshold storage 18. This set of threshold values is delivered to comparator circuit 20 which compares the threshold values to the outputs from the pixels to determine which threshold values have been met or exceeded by each particular pixel output. Decoder 22 receives the output from comparator circuit 20 and provides to display device 24 a grey level step indicative of the threshold met or exceeded. The grey level steps are output device dependent. In this example four levels are assumed as values of $\frac{1}{4}$, $\frac{1}{2}$, $\frac{3}{4}$, and 1. The procedure is repeated for each image pixel in imaging device 12 in order to accurately reproduce the entire original image. This may be accomplished by a consecutive progression through each line and column position in the pixel matrix or by other similar means.

Figure 2:
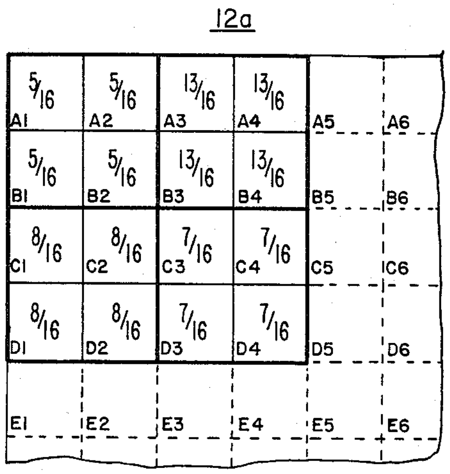
FIG. 2 is a detailed diagrammatic representation of a sample display processor imaging device receiving a set of image samples of various values.

A more detailed representative diagram of an imaging device 12*a* and a sample image intensity distribution thereon are shown in FIG. 2. The original image samples incident upon pixel sites A1, A2, B1 and B2 have an input grey level of 5/16. The original input grey level of the image samples incident upon pixels A3, A4, B3 and B4 is 13/16. The set of pixels C1, C2, D1 and D2, and the set containing pixel elements C3, C4, D3 and D4, receive 8/16 and 7/16 input grey levels, respectively. This intensity distribution of the incident radiation provides a like intensity distribution of the output signals from the pixels. According to the invention, these pixel output signals are compared with the various threshold levels which are indicated by the values in sixteenths written on each pixel in imaging device 12*b*, FIG. 3.

Figure 3:
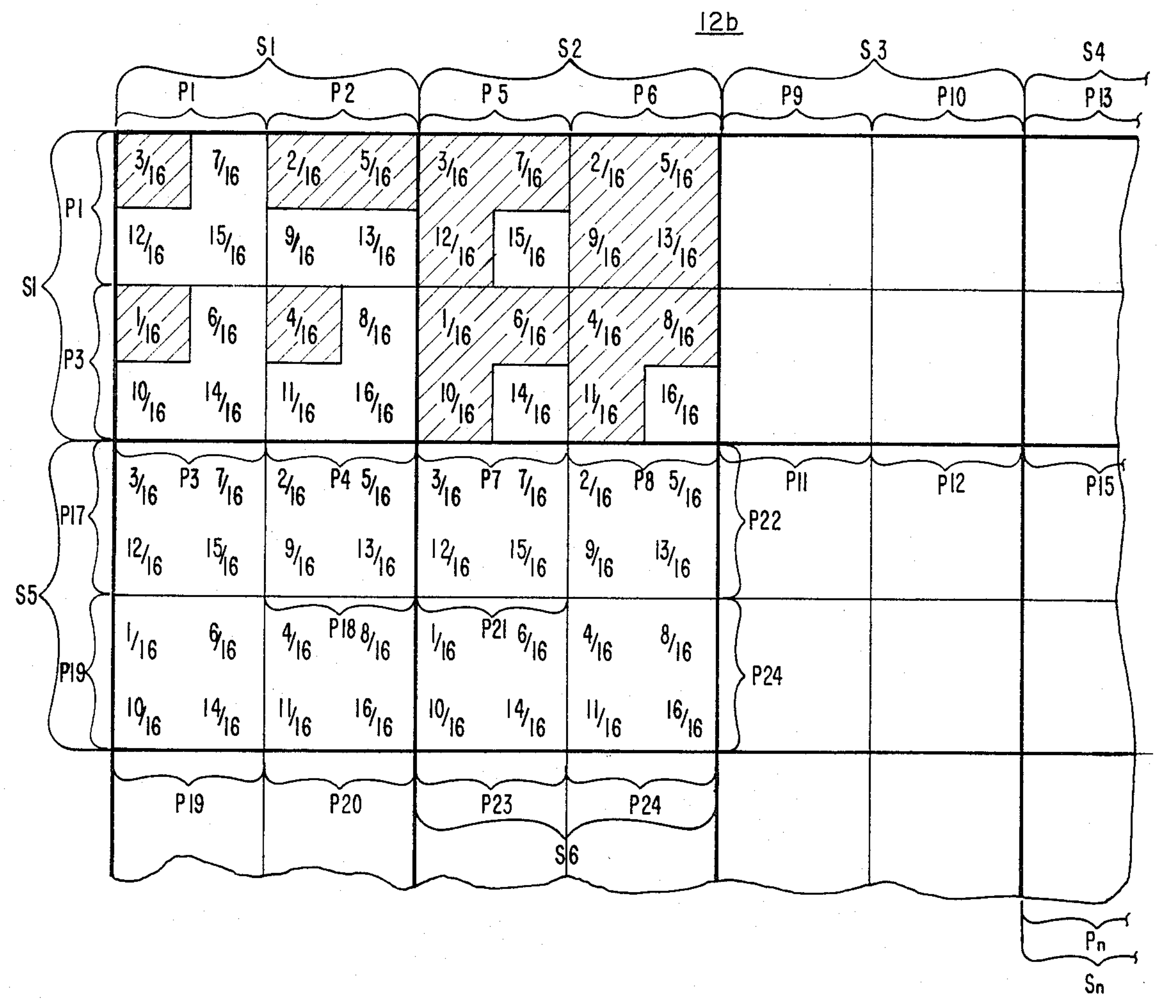
FIG. 3 is a diagrammatic representation of the assignment of non-uniform threshold coding values according to this invention.

Imaging device 12*b*, FIG. 3, is comprised of a plurality of superpixel components S1–Sn arranged in a matrix configuration which is dependent on the particular application desired. Each superpixel component S1–Sn is comprised of a number of individual pixel elements P1–Pn. The actual number of individual pixel elements P1–Pn contained in each superpixel S1–Sn is dependent on the particular application desired. There are four individual pixel elements for each superpixel component in imaging device 12*b*. Superpixel component S1 is comprised of pixel elements P1, P2, P3, and P4, and superpixel S2 is comprised of pixel elements P5, P6, P7, and P8.

Each individual pixel element has an associated set of input threshold values. All the threshold levels of all the sets constitute a field of uniform increments. These input threshold levels are non-uniformly distributed within each pixel element. Imaging device 12*b*, FIG. 3, employs a unique method of threshold coding in order to stagger the input threshold values of each pixel element. Consequently, the incremental variance between threshold levels, while non-uniformly distributed within each particular pixel element, are uniformly distributed among all of the pixels of each superpixel component.

Superpixel component S1 consists of pixel elements P1–P4. Each of these pixel elements has associated with it four non-zero input threshold values. For the purpose of clarity, these thresholds are written right on the pixel in FIG. 3, but they are in fact only applied by the threshold storage 18 to comparator 20, FIG. 1.

Each of the threshold values for each pixel element differs from the threshold values of each other pixel element within a superpixel component. Consequently, while the incremental variance of threshold values applied is uniform for each superpixel component (e.g., 1/16–16/16 in superpixel component S1), the threshold increment variance for any single pixel element is non-uniform. The threshold values associated with pixel element P1 are 3/16, 7/16, 12/16 and 15/16. The threshold values associated with pixel element P2 are 2/16, 5/16, 9/16, and 13/16. Pixel element P3 has associated with it threshold values of 1/16, 6/16, 10/16 and 14/16, and pixel element P4 has threshold values of 4/16, 8/16, 11/16 and 16/16.

While the set of threshold values for each individual pixel element differs from the set of threshold values for each of the other pixel elements within the same superpixel component, in this embodiment the sets of threshold values are identical for each corresponding pixel position within every superpixel component. For example, pixel elements P1 and P5 have identical sets of threshold values, which differ from those of pixel elements P2, P3, P4, and P6, P7, P8, respectively.

This staggering of threshold values provides a substantial increase in the quantity of available non-zero grey levels without the necessity to increase the number of input thresholds per individual pixel element because the individual pixel elements of a specific superpixel no longer react identically to the same intensity image sample. Rather, each element may react in a slightly different manner to a particular image sample whose intensity exceeds more thresholds of a first pixel than it does those of a second pixel. For example, a 5/16 original grey level image sample will exceed only the first of the four available threshold levels in pixel element P1, while the same 5/16 grey level image sample will exceed the first two of the four available threshold levels in pixel element P2. Consequently, the accuracy of reproduction of the overall image is greatly improved. This is because while each individual image sample is still represented with only four non-zero grey levels, the staggered thresholds provide sixteen available non-zero grey levels for the overall reproduction of every four image samples.

The pixel elements of superpixel S1 (P1–P4) produce an output representative of the 5/16 original image sample incident on sites A1, A2, B1 and B2 of imaging device 12*a*, FIG. 2. The output of each pixel element, however, varies according to the particular set of threshold values assigned to it. Pixel element P1 produces a $\frac{1}{4}$ grey level output because the original 5/16 image sample exceeds the first, but does not achieve the second, of the four available non-zero threshold levels of that particular pixel element. Pixel element P2 produces a grey level output of $\frac{1}{2}$ because the original 5/16 image sample exceeds the first two, but does not achieve the third, of the four available non-zero threshold levels of that pixel element. Likewise, pixel elements P3 and P4 produce grey level outputs of $\frac{1}{4}$ each because the original 5/16 image sample exceeds the first, but does not achieve the second, of the four available non-zero threshold levels of each of those pixel elements. For the purpose of clarity, these intensity levels are shown as sections or quadrants of each pixel element in FIG. 3, but they each are applied to the one pixel output.

The accuracy of reproduction of the overall image is improved considerably as a result of the staggered threshold coding. This is because each individual pixel element is capable of responding differently to identical image samples. The staggered threshold coding provides sixteen available non-zero levels for every four image samples. The 5/16 original image samples from sites A1, A2, B1 and B2 of imaging device 12*a*, FIG. 2, exceed one threshold level in pixel elements P1, P3, and P4 and two threshold levels in pixel element P2. This allows a 5/16 intensity output over the four image sample area represented by superpixel S1 in FIG. 3, because the corresponding original image samples exceed the first five, but do not achieve the remaining eleven of the sixteen available non-zero threshold levels of that particular superpixel component (S1).

Each of the pixel elements P5, P6, P7, and P8 of superpixel component S2 produces an output representative of the corresponding image samples from sites A3, A4, B3 and B4 of imaging device 12*a*, FIG. 2. The original 13/16 grey level image samples exceed only the first three threshold levels of pixel elements P5, P7, and P8, but exceed all four available non-zero threshold levels of pixel element P6. The resulting output of the overall four unit image sample is an accurate reproduction of the four original 13/16 grey level image samples.

Each of the pixel elements P17, P18, P19 and P20 of superpixel component S5 produces an output representative of the corresponding image samples from sites C1, C2, D1 and D2 of imaging device 12*a*, FIG. 2. The original 8/16 samples exceed the first two of the four available non-zero threshold levels of each pixel element in superpixel component S5. The resulting output of superpixel component S5 is an accurate reproduction of the four original 8/16 image samples.

Pixel elements P21, P22, P23 and P24 of superpixel component S6 produce an accurate output representative of the original 7/16 image samples incident on sites C3, C4, D3 and D4 of imaging device 12*a*, FIG. 2. This results from the fact that the original 7/16 image samples incident upon those sites exceeds seven, but does not achieve the remaining nine of the sixteen non-zero threshold levels available in pixel elements P21, P22, P23 and P24.

The pixel elements (P9–P16 and P25–Pn) of each remaining superpixel component (S3, S4; and S7–Sn) produce outputs that can through the thresholding technique of the invention accurately represent the original image samples incident upon the corresponding sites of imaging device 12*a*, FIG. 2.

The overall accuracy of image reproduction is greatly improved in a display processor system which uses threshold coding according to this invention. This results from the increased quantity of non-zero threshold levels that are available for reproduction of images. The resolution of such reproduced images is significantly improved. Gradual variations in intensity no longer appear banded and low modulation features are no longer lost entirely.

In addition, the cost and complexity of such display devices are not increased dramatically because the staggering of threshold values allows the increased quantity of available non-zero threshold levels without requiring additional thresholds for each individual pixel element.

Figure 4A:
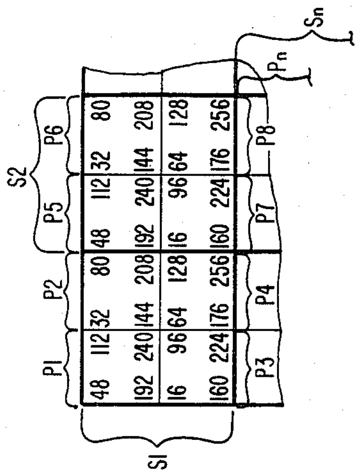
FIG. 4A is a representative drawing of the various threshold level values of FIG. 3 adjusted to a base of 256.
Figure 4B:
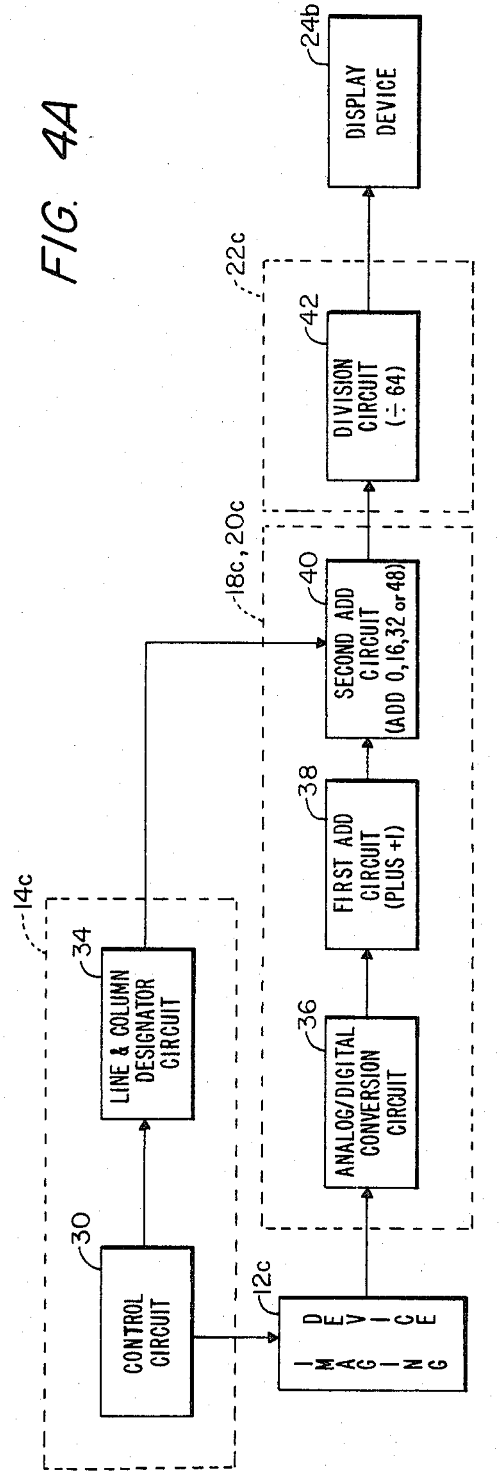
FIG. 4B is a simplified block diagram of an implementation of a system using the 256 base according to this invention.

FIGS. 4A and 4B describe an alternative embodiment of a system for implementing the improved threshold coding according to this invention which eliminates the necessity of extensive threshold memory/storage capabilities and complex comparator circuitry.

FIG. 4A depicts the numerators of each associated threshold value for a common denominator of 256. This denominator is chosen because conventional analog to digital conversion devices typically provide 256 output levels. Superpixel component S1 includes pixel elements P1, P2, P3 and P4. The threshold values associated with pixel element P1 are 48, 112, 192, and 240, and are equal to 3/16, 7/16, 12/16, and 15/16, respectively. The threshold values associated with pixel element P2 are 32, 80, 144 and 208. The sets of threshold values associated with pixel elements P3 and P4 are 16, 96, 160 and 224; and 64, 128, 176, and 256, respectively. While the threshold values for each pixel element within a superpixel component are different, the threshold values for each pixel in a corresponding position of every superpixel are identical in this embodiment. Each set of threshold values for the pixel elements P5, P6, P7 and P8 of superpixel component S2, therefore, are identical to the corresponding set of threshold values for the pixel elements P1, P2, P3 and P4 in superpixel component S1. Each pixel element P9–Pn in each of the remaining superpixel components S3–Sn will have the particular set of threshold values that is associated with its particular position within the superpixel component. When the threshold values are considered in regard to a common denominator of 256, a circuit, FIG. 4B, can be devised for assigning the positionally dependent threshold levels and testing for the attainment of each threshold level, without the use of extensive memory/storage capabilities and complex comparator means.

Imaging device 12*c*, FIG. 4B, delivers a series of outputs representative of the original image samples that are incident upon each of its pixel sites, to analog to digital converter circuit 36. Analog to digital converter circuit 36 converts the output from imaging device 12*c* to a digital output which is delivered to first add circuit 38. First add circuit 38 adds 1 to the digital output from analog to digital converter circuit 36 because that circuit is only capable of producing an output of 0–255, thereby creating an inherent inaccuracy of $-1$. This inaccuracy is corrected by first add circuit 38. This corrected sum, representative of the intensity of the original image sample incident upon each pixel site, is delivered to second add circuit 40.

Control circuits 30 determine the pixel position of each consecutive image sample on imaging device 12*c* and deliver that information to line and column designator circuit 34. Line and column designator circuit 34 determines which of the four possible factors (0, 16, 32, or 48) will be added, by second add circuit 40, to the corrected sum from first add circuit 38 for the appropriate processing. This determination is based on the incident location, within a superpixel, of each particular image sample. For example, if control circuits 30 determine that a particular image sample is incident upon a pixel site that is located in an odd row and an odd column of the imaging device matrix (P1 or P5, FIG. 4A), line and column designator circuit determines that 16 be added, by second add circuit 40, to the corrected sum from first add circuit 38. If the particular image sample is incident upon an odd row, even column pixel site (P2 or P6, FIG. 4A), 32 is added to the corrected sum from first add circuit 38. If the particular image sample is incident upon an even row, odd column pixel site (P3 or P7, FIG. 4A) or an even row, even column pixel site (P4 or P8, FIG. 4A), 48 or zero, respectively, is added to the corrected sum from first add circuit 38, FIG. 4B. This second addition normalizes the thresholds for each pixel to be comparatively evaluated and then decoded by division circuit 42 as follows.

After the appropriate addition is performed by second add circuit 40, FIG. 4B, the new sum is delivered to division circuit 42, where it is divided by 64. The resulting quotient is delivered to the display device 24*b* as an output greyscale step of zero to four, depending on the original intensity of each particular image sample and its incident location on the imaging device 12*c*. The procedure is repeated for each image sample incident upon imaging device 12*c* in order to reproduce the entire image.

Figure 5:
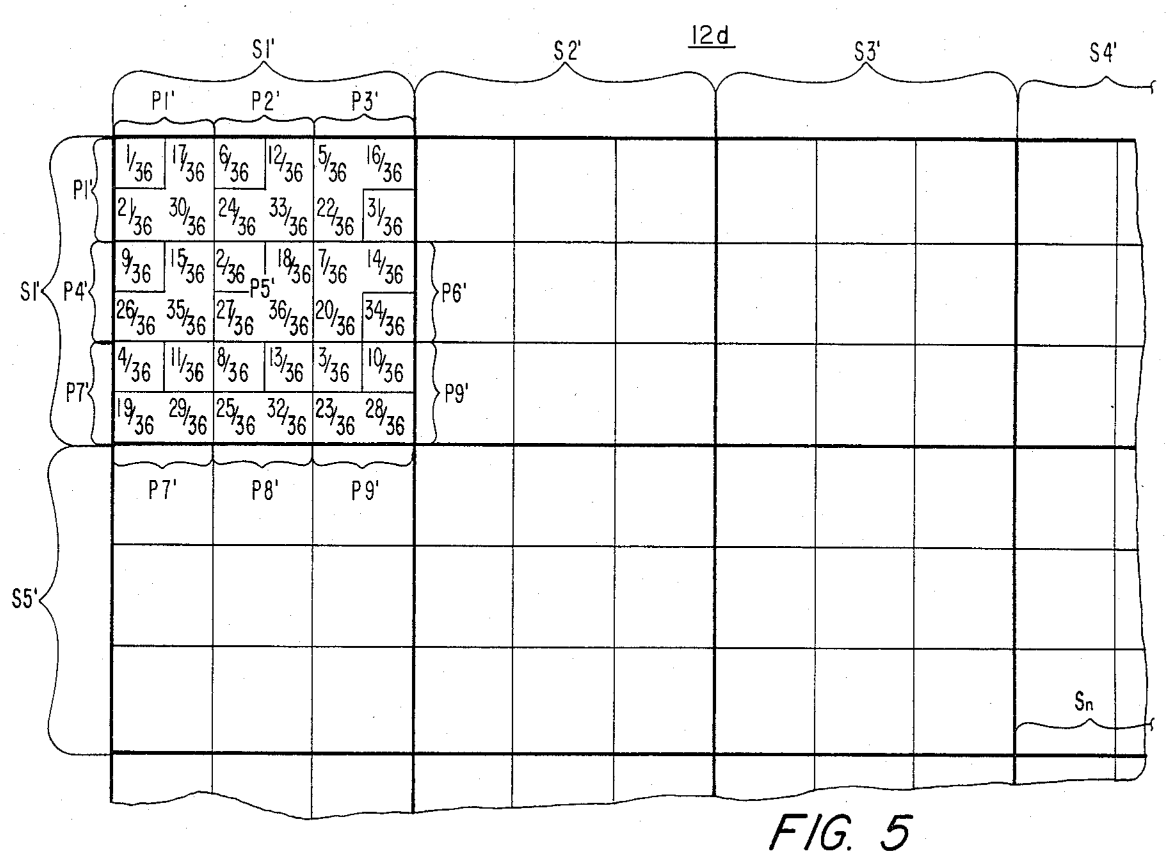
FIG. 5 is a diagramatic representation similar to that depicted in FIG. 3 utilizing an alternative superpixel configuration and alternative threshold values.

An alternative matrix configuration imaging device 12*d* is shown in FIG. 5, which employs nine pixel elements for each superpixel component S1′–Sn′. For example, superpixel component S1 is comprised of pixel elements P1′–P9′. Each pixel element has four non-zero threshold levels. The threshold coding staggers each threshold level as described previously, thereby providing 36 individual threshold levels which are non-uniformly distributed among all of the pixel elements of each superpixel component.

The resolution and accuracy of reproduction of image samples having more original grey levels than those depicted in FIG. 2 is considerably improved by an embodiment such as that described in FIG. 5.

The number and configuration of individual pixel elements in each superpixel component, as well as the quantity of non-zero grey level thresholds per individual element, are variable based on the particular application desired and may be uniform or random.

Figure 6:
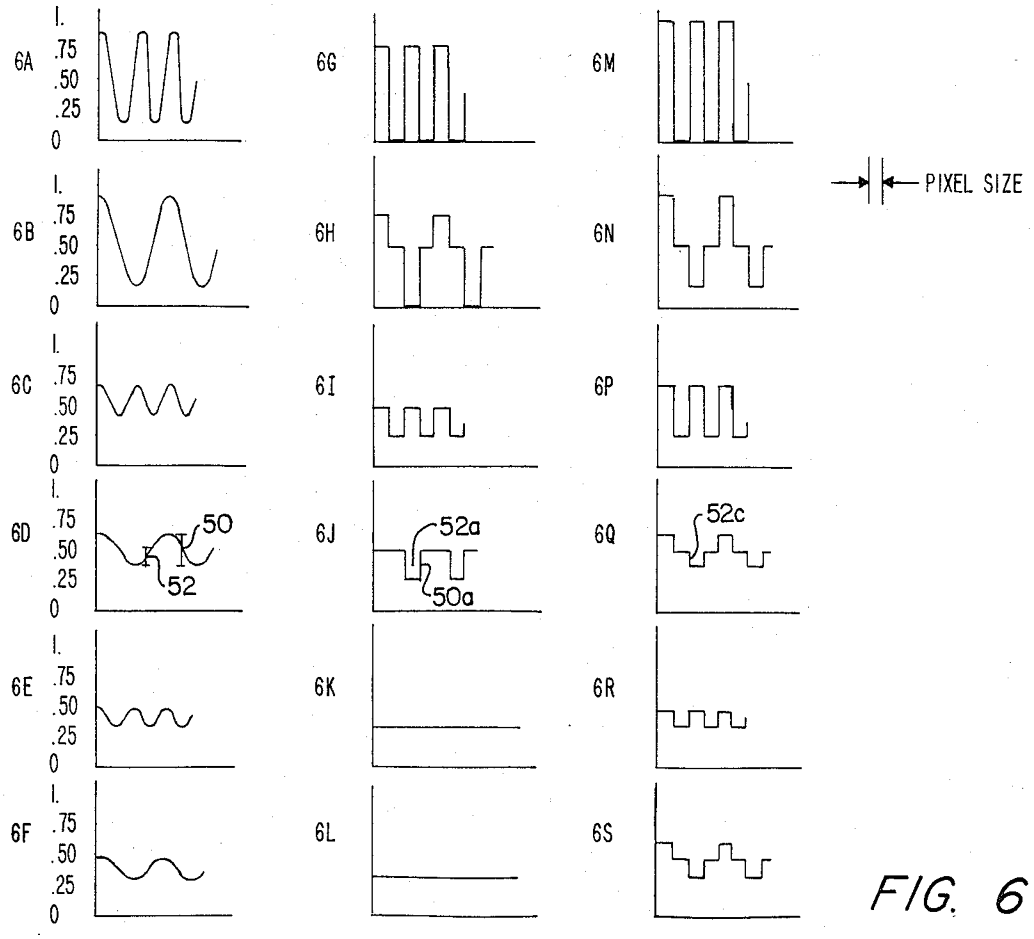
FIG. 6 is a graphic representation of a series of input sine waves and their associated output representations which depict the improved resolution capabilities of a display processor system according to this invention.

The charts in FIG. 6 show the improved resolution capabilities of a display processor system having staggered threshold coding according to this invention. The first column of charts (FIGS. 6A–6F) represents the input grey level sine wave of the original image sample incident on the imaging device. The second column of charts (FIGS. 6G–6L) represents the grey-scale output attained from conventional display processor systems with nominal threshold levels and the third column of charts (FIGS. 6M–6S) represents the improved grey scale output attainable from a display processor system which employs variable threshold coding according to this invention.

The conventional system having four non-zero grey levels per pixel element will produce an output as shown in charts 6G–6L. While the output is representative of the original image data, it is not an entirely accurate representation. As a result of the levels being uniformly distributed in increments of $\frac{1}{4}$ each, any increases of intensity in the original grey-level image sample that are less than the $\frac{1}{4}$ threshold increment are represented by the next lower output greyscale step, thereby resulting in an inaccurate representation. For example, an original image grey-level intensity of less than 0.025 is represented as zero.

The output of a display processor system according to this invention, as shown in charts 6M–6S, is a more accurate representation of the original image. As a result of the non-uniform distribution of the staggered threshold levels in the disclosed embodiment there are sixteen available non-zero threshold levels for every four image samples. This allows an accurate average reproduction of variation in original image intensities that are as slight as 0.0625. While this level of accuracy is not attainable in any single pixel element representation of a single image sample, it can be attained in samples of four or more image units and over the entire screen area.

For example, an original image sample sine wave such as that shown in FIG. 6A, having relatively large variations from zero to one, are represented with similar accuracy in conventional devices (shown by FIG. 6G) and devices according to this invention (shown by FIG. 6M). There is some improvement of grey level resolution resulting from the fact that the device according to this invention can more accurately reproduce grey level variations which are smaller in increment than the conventional threshold variance increments. Likewise, there is an improvement in resolution of a display processor according to this invention, over that of conventional devices, in situations where the original image sine wave resembles that depicted in FIGS. 6B and 6C. The improvement results from the ability of the subject imaging device to reproduce variations in grey levels which conventional systems display as uniform continuous level images. The conventional nominal threshold output is shown in FIGS. 6H and 6I. The varying threshold output of this invention is shown in FIGS. 6N and 6P.

Where the original input sine wave variations include fluctuation increments less than those of the nominal threshold, the resolution and accuracy of reproduction is considerably enhanced by a display processor system which employs improved threshold coding according to this invention. For example, the original input sine waves depicted in FIG. 6D include fluctuations in excess of the $\frac{1}{4}$ nominal threshold variance increments (shown at 50) and fluctuations less than the $\frac{1}{4}$ nominal threshold variance increments (shown at 52). While the output shown in FIG. 6J from the nominal threshold device can reproduce the larger fluctuations (shown at 50*a*), it is inherently incapable of reproducing fluctuations in increments smaller than the threshold variance increments of the device (i.e., $\frac{1}{4}$). These fluctuations are represented by a continuous level output (shown at 52*a*).

The improved imaging device of this invention, utilizing the staggered threshold coding, can more accurately reflect the less extreme fluctuations of the original input sine wave (shown at 52 of FIG. 6D). FIG. 6Q shows the output sine waves of the improved display device. The minor fluctuations which were inaccurately represented by the nominal threshold device are accurately reflected here at position 52*c*.

The sine waves depicted in FIGS. 6E and 6F are extreme cases showing all fluctuations below the nominal threshold variance increment of $\frac{1}{4}$. The conventional imaging device representation shown in FIGS. 6K and 6L are not at all representative of the actual input sine wave. FIGS. 6R and 6S indicate the improved resolution and accuracy of reproduction that can be achieved by the use of staggered threshold coding according to this invention.

Figure 7:
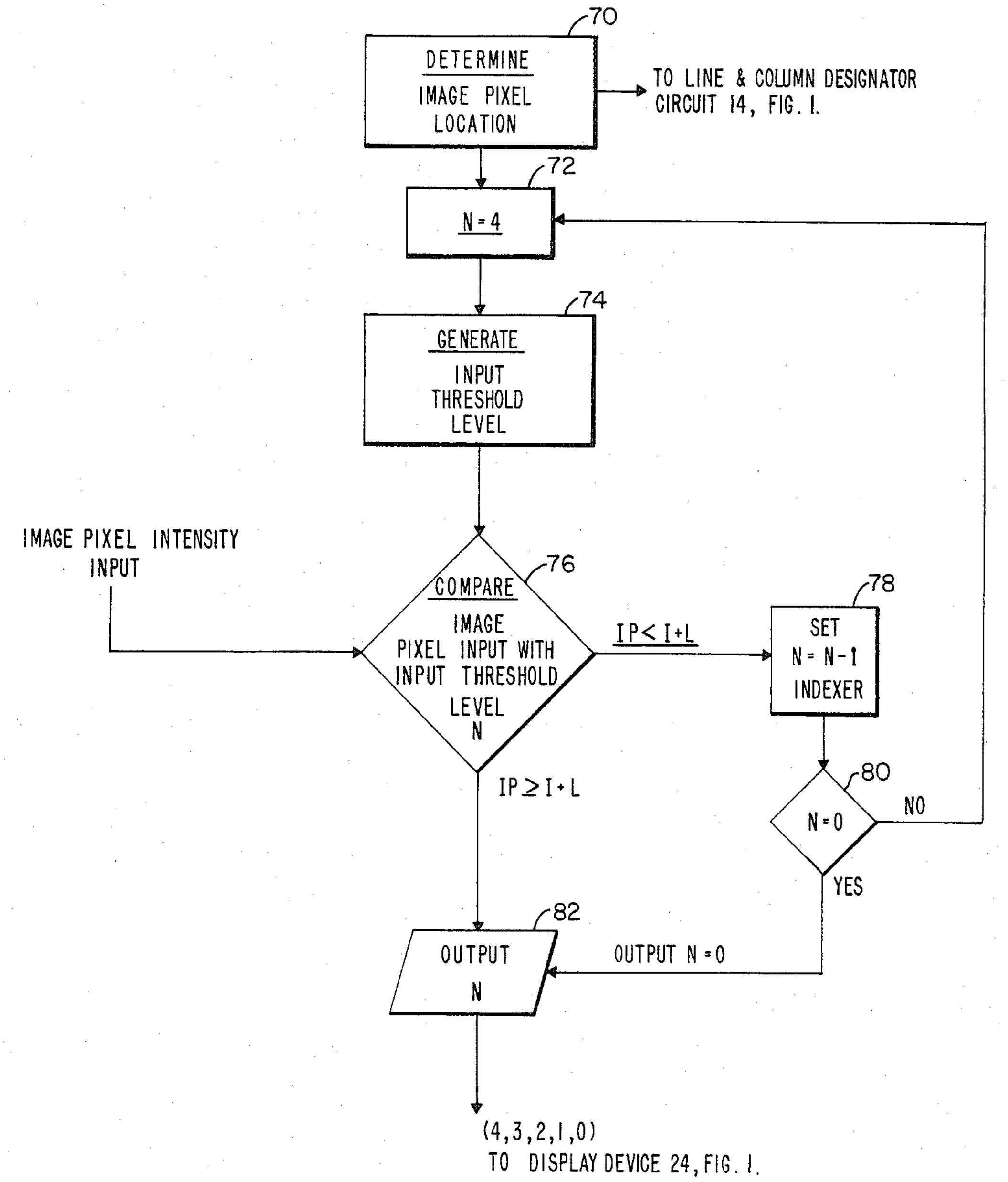
FIG. 7 is a flow chart for a program which may be used to implement this invention.

A descriptive flowchart of a computer program which may be used on a Data General S-230 computer for implementing the non-uniform threshold coding values depicted in FIG. 3 is shown in FIG. 7. The image pixel location for each image sample is determined in step 70. The location data is delivered to line and column designator circuit 14, FIG. 1. Grey scale register N is set equal to a value of 4 in step 72. An input threshold level is generated from on-line storage in step 74. This input threshold level N is then delivered to comparison operation, step 76, which compares the image sample from imaging device 12*a*, FIG. 2, to the threshold level generated from on-line storage (Step 74 above). If the image sample from the imaging device is equal to or greater than the input threshold level N, the output is delivered to display device 24, step 82, as an intensity value equal to the greyscale step, N, corresponding to that particular threshold level.

If the image pixel data from the imaging device is less than the threshold, grey scale level N is set to equal N-1, in order to test the next lower pixel threshold value against the image sample.

The input threshold value is first tested in Step 80. If threshold value N is not equal to zero, the reduced threshold value is once again tested against the image sample from the imaging device and the process is repeated. If the input threshold value is equal to zero, threshold value N (zero) is delivered to display device 24, FIG. 1, as output (Step 82). The display intensity output is equal to 4, 3, 2, 1 or zero, according to the number of available non-zero grey level thresholds that have been met or exceeded by the image pixel intensity incident upon each pixel site.

Other embodiments will occur to those skilled in the art and are within the following claims:

What is claimed is:

1. A display processor system for reproducing an image in a set of more than two greyscale steps comprising:
- a plurality of superpixels each including a number of pixels for providing an output representative of an incident image portion;
- means for providing a set of threshold levels for each pixel in a superpixel, which set is different from each of the sets of threshold levels of the other pixels in that superpixel and different from the set of greyscale steps;
- means for identifying the position of a given pixel in a superpixel and designating the particular set of threshold levels corresponding to the position of that given pixel;
- means for comparing the output of the given pixel with said particular set of threshold levels; and
- means, responsive to said means for comparing, for indicating a greyscale step in said set of more than two greyscale steps in response to an output from said given pixel equal to or in excess of at least one of said threshold levels in the set of threshold levels corresponding to that pixel position.

2. The display processor system of claim 1 in which the set of threshold levels is the same for each pixel in the same location in each superpixel.

3. The display processor system of claim 1 in which all the threshold levels of all the sets in a superpixel constitute a field of uniform increments.

4. The display processor system of claim 3 in which all the threshold levels constituting the field of uniform increments are non-uniformly distributed in the pixels of a superpixel.

5. A method for reproducing an image in a set of more than two greyscale steps comprising:
- providing a set of threshold levels for each pixel in a superpixel of an imaging device, which set is different from each of the sets of threshold levels of the other pixels in that superpixel and different from the set of greyscale steps;
- identifying the position of a given pixel in a superpixel and designating the particular set of threshold levels corresponding to the position of that given pixel;
- comparing the output of the given pixel with its particular set of threshold levels; and
- indicating a greyscale step in the set of more than two greyscale steps in response to an input to said given pixel equal to or in excess of at least one of said threshold levels in the set of threshold levels corresponding to that pixel position.

* * * * *